US008655896B2

(12) United States Patent
Rosenberg et al.

(10) Patent No.: US 8,655,896 B2
(45) Date of Patent: Feb. 18, 2014

(54) APPARATUS AND METHODS FOR ORGANIZING DATA ITEMS HAVING TIME OF LIFE INTERVALS

(71) Applicant: Barr Rosenberg, The Sea Ranch, CA (US)

(72) Inventors: Barr Rosenberg, The Sea Ranch, CA (US); Mark Gilbeau Howard, Orinda, CA (US); Till Gaston Balz Bay, Zurich (CH); Bernd Kurt Alexander Schoeller, Zurich (CH)

(73) Assignee: Barr Rosenberg, The Sea Walk, CA (US)

( * ) Notice: Subject to any disclaimer, the term of this patent is extended or adjusted under 35 U.S.C. 154(b) by 0 days.

(21) Appl. No.: 13/681,137

(22) Filed: Nov. 19, 2012

(65) Prior Publication Data

US 2013/0080456 A1 Mar. 28, 2013

Related U.S. Application Data

(63) Continuation of application No. 12/713,131, filed on Feb. 25, 2010, now Pat. No. 8,341,164.

(51) Int. Cl.
*G06F 17/30* (2006.01)

(52) U.S. Cl.
USPC .......................... 707/755; 707/716; 707/797

(58) Field of Classification Search
USPC ......... 707/695, 778, 797, 798, 956, 755, 716, 707/786
See application file for complete search history.

(56) References Cited

U.S. PATENT DOCUMENTS

| 7,870,139 | B2 | 1/2011 | Cookson et al. |
| 8,250,491 | B2 * | 8/2012 | Holmes ......................... 715/853 |
| 8,341,164 | B1 * | 12/2012 | Rosenberg et al. ........... 707/755 |
| 2005/0147947 | A1 | 7/2005 | Cookson et al. |

* cited by examiner

*Primary Examiner* — Cheryl Lewis
(74) *Attorney, Agent, or Firm* — Orrick, Herrington & Sutcliffe LLP

(57) ABSTRACT

A data structure for storing items of information having a time of life includes a time of life interval for each item of information, and methods for using the same. The items of information are organized in a data structure having nodes and edges connecting the nodes. This data structure is preferably a directed acyclic graph structure. The data structure includes parent nodes and child nodes. The time of life interval specified for any child node generally is contained within the time interval specified for that child node's parent node, such that the data structure includes no child nodes with a time of life interval that falls outside of the time of life interval of its parent node.

55 Claims, 14 Drawing Sheets

FIG. 11a

| Company ID | Company Name | Shares in Market |
|---|---|---|
| 1 | ABC Corp. | 2,000,000 |

FIG. 11b

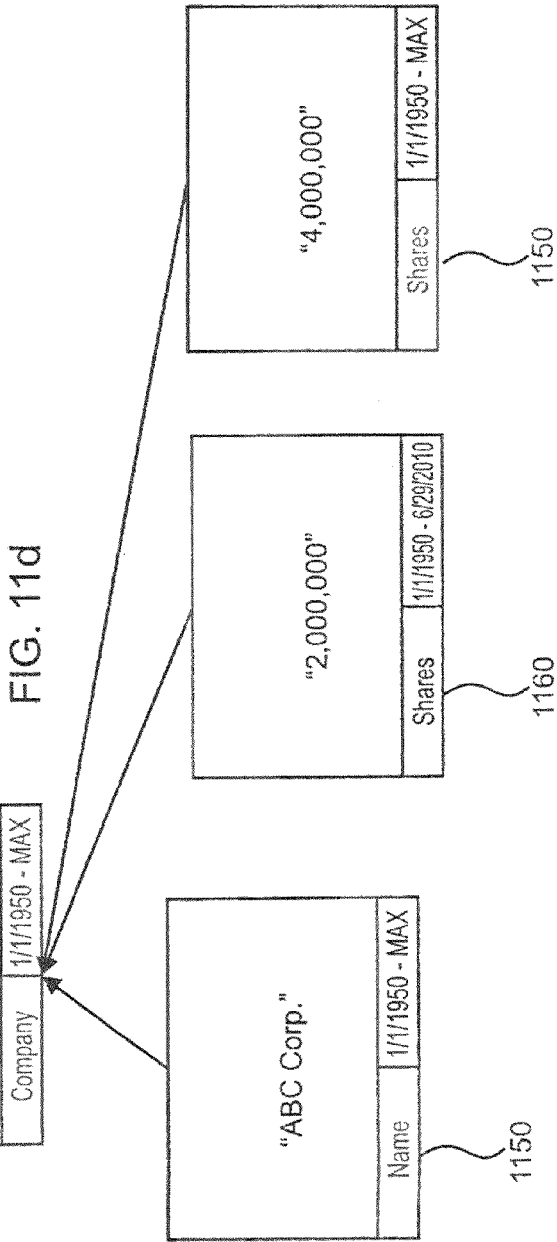

APPARATUS AND METHODS FOR ORGANIZING DATA ITEMS HAVING TIME OF LIFE INTERVALS

This application is a continuation application of U.S. Nonprovisional application Ser. No. 12/713,131, now U.S. Pat. No. 8,341,164, filed on Feb. 25, 2010. Priority to the prior application is expressly claimed, and the disclosure of the application is hereby incorporated herein by reference in its entirety.

BACKGROUND OF THE INVENTION

Most computer systems store and process information. This information is a model of objects in the real world, including physical objects, with all of their complexity and details. Sometimes it is possible to define ahead-of-time a clear data structure for a particular application, or use, of this real world data, with the right level of accuracy. However, much of the real world data stored and processed by modern computer systems cannot have a clear data structure imposed on it before it is understood what uses this data will be put to.

For example, a system that captures information about companies and company relations to help decision-making and risk analysis needs the flexibility to constantly re-think, or modify, what information is stored. Adding new fields to a traditional database requires a global change to the whole schema. For example, even if a given field of information is only relevant for a specific company, the field is added to every company in the database. The only way to reliably and permanently remove information from a traditional database is to delete it. Any other mechanism (such as marking the information as deleted) exposes a risk of creating an inconsistent database, because the related information remains in the database, even though its underlying database entry is not valid anymore. Thus it is possible that this non-valid data could be accessed by a user of the database, creating unintended consequences or errors.

Thus there is a need for an apparatus and methods that permit data items which reflect facts about real world objects to be stored, organized and manipulated using a structure that does not impose rigid structure to the data, and that allows a set of stored data to be easily stored, accessed, updated, and manipulated for a variety of purposes.

BRIEF SUMMARY OF EMBODIMENTS OF THE INVENTION

In an aspect of an embodiment of the invention, a data item stored in the apparatus is represented as an entry comprising an item of information, and a time of life interval for that item of information.

In another aspect of an embodiment of the invention, the data items are stored in a directed acyclic graph, having parent and child nodes.

In another aspect of an embodiment of the invention, the time of life interval of a child node is always within the time of life interval of that child's parent node.

In another aspect of an embodiment of the invention, the directed acyclic graph is updated with changed values by splitting a node containing the old value into a new node, containing the changed value and a new time of life interval which begins as of the time of the change in value, and retaining the old node with the old value and an updated time of life interval that is terminated as of the time of the change in value.

In another aspect of an embodiment of the invention, relations between data items are represented by edge types within the directed acyclic graph.

In another aspect of an embodiment of the invention, the directed acyclic graph is indexed using an index table.

In another aspect of an embodiment of the invention, access to each data item is controlled by a permission list for that data item.

In another aspect of an embodiment of the invention, the data items are accessed using a query language.

In another aspect of an embodiment of the invention, the results of a query on the data items are expressed as a directed acyclic graph that is a subset of the queried data items.

In another aspect of an embodiment of the invention, updates to the directed acyclic graph are made by merging a new directed acyclic graph with the existing directed acyclic graph.

In another aspect of an embodiment of the invention, changed data in the directed acyclic graph is preserved using versioning to retain prior versions of the directed acyclic graph.

In another aspect of an embodiment of the invention, legacy databases are transformed into directed acyclic graph data structures having parent and child nodes, storing data items comprising an item of information, and a time of life interval for that item of information, such that the time of life interval of a child node is always within the time of life interval of that child's parent node.

In another aspect of an embodiment of the invention, these legacy databases are merged into a larger directed acyclic graph data structure containing data from a plurality of legacy databases.

In another aspect of an embodiment of the invention, this merged database is further transformed into a plurality of subset databases, each subset database comprising data items from a plurality of the legacy databases.

BRIEF DESCRIPTION OF THE DRAWINGS

FIG. 8 is a representation of a method of querying a journal data structure, to return a sliced journal data structure, according to an embodiment of the invention.

FIG. 11a is a representation of a record in a legacy database.

FIG. 11b is a representation of the record of FIG. 11a, transformed into a journal data structure according to an embodiment of the invention.

FIG. 11c is a representation of an update record in a legacy database.

FIG. 11d is a representation of the journal data structure of FIG. 11b, updated with the update record of FIG. 11c, according to an embodiment of the invention.

DETAILED DESCRIPTION OF PREFERRED EMBODIMENTS OF THE INVENTION

In a computer system used to store and process information, this information can be stored as data in a variety of data structures. Some data is stored as tightly structured data, typically when it is known ahead of time (e.g. when the data is first captured) what uses that data will be put to. However, it is frequently difficult to anticipate all of the uses to which data will be put, and thus tightly structured data can be inflexible. In such situations, the data is structured instead using a more loose data structure, that captures a minimal amount of useful structure, without further constraining the data.

Figure 1:
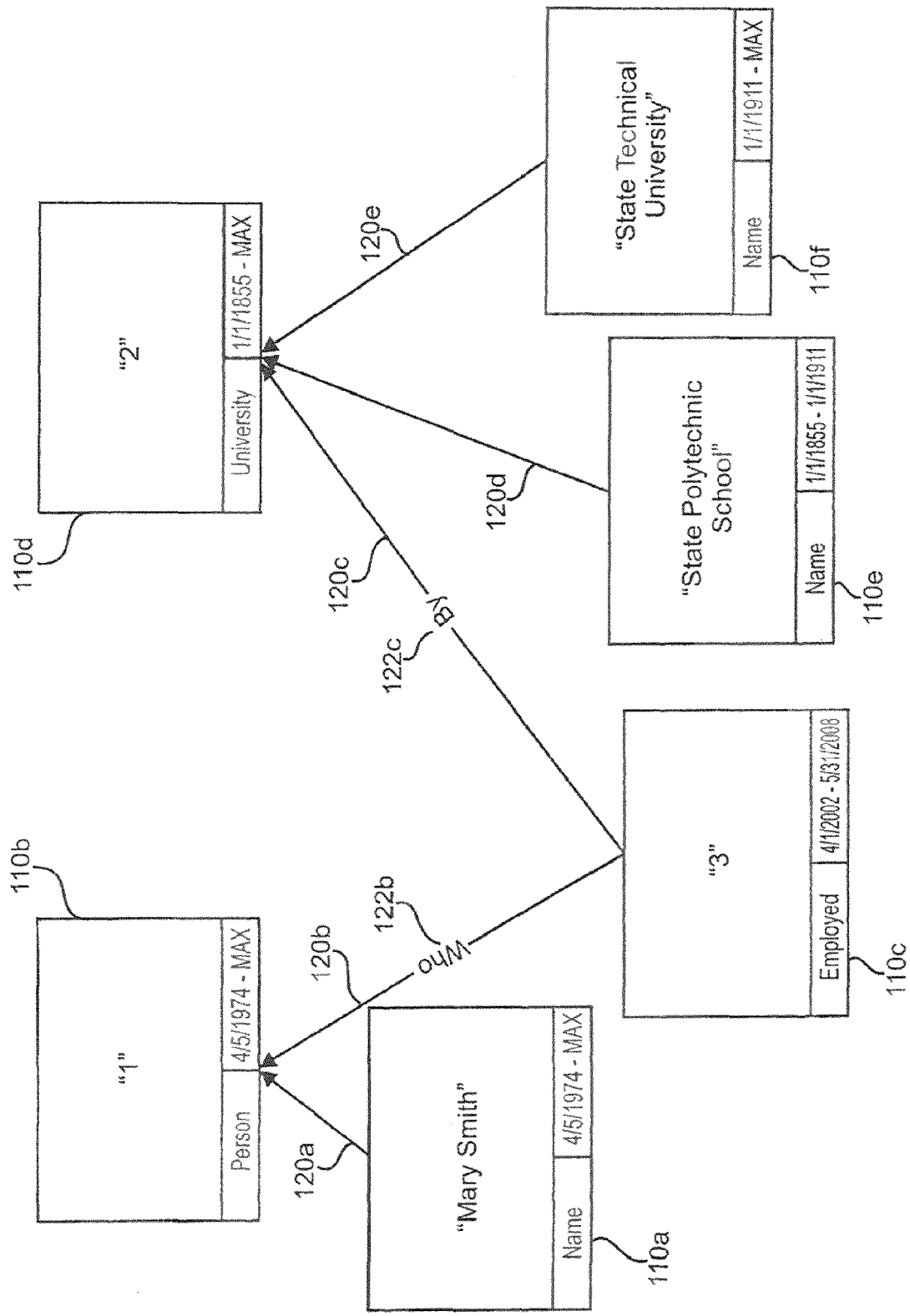
FIG. 1 is a graphical representation of a journal data structure, according to an embodiment of the invention.

In an embodiment of the invention, one particularly useful way of organizing data is to record the data in a data structure as shown in FIG. 1. This data structure is a directed acyclic graph (DAG) 100, that structures information using parent-child relationships. A directed acyclic graph is a directed graph with no directed cycles. That is, it is formed by a collection of nodes 110 and directed edges 120, each edge 120 connecting one node 110 to another, such that there is no way to start at a given node, such as node 110a, and follow a sequence of directed edges 120 that loops back to that same node 110a again. A directed edge 120 is an edge that is used to traverse the graph from one node 110 to another node 110, but only in one direction. For example, the directed edge 120a between nodes 110a and 110b permits traversal of the graph from node 110a to 110b, but not from node 110b to node 110a.

Nodes 110 in the data structure 100 can be related to other nodes 110 through a child/parent relationship. That is, one node 110 can be the child of another node 110. A node 110 is a child of another node 110 if the child node 110 has a directed edge 120 connecting from the child node 110, in the direction of traversal, to a parent node 110. For example, node 110a is a child of node 110b, in FIG. 1. Similarly, a node 110 is a parent of another node 110 if the parent node 110 has a directed edge 120 connecting from the parent node 110, against the direction of traversal of the directed edge 120, to a child node 110. For example, node 110b is a parent of node 110a, in FIG. 1. Nodes 110 may have multiple children, or multiple parents. For example, nodes 110a and 110c are both children of node 110b. Similarly, nodes 110b and 110d are both parents of node 110c.

The directed edges 120 can be annotated with an edge type 122. Use of edge types 122 permit the data structure 100 to model certain types of parent/child relationships. For example, the node 110c represents that there is an employment relationship between the person of node 110b and the university of node 110d. However, the node 110c, standing alone, does not indicate whether it is the person that is employed by the university, or the university that is employed by the person. Both scenarios are possible in the real world. For example, the person may be a scientist who works for the university. On the other hand, the person may have hired the university to conduct some research. To distinguish between these two possibilities, the directed edges 120b and 120d are annotated to indicate how the two nodes 110b and 11d are related to the node 110c. In this example, the edge type 122b "who" indicates that the person 11b is the "who" (i.e. the employee), whereas the edge type 122d "by" indicates that the university is the "by" (i.e. the employer). Similarly, if the two parent nodes were each companies, one of which owned the other, then a common child node would be created to contain the fact "ownership status", and an edge of edge type "owns" would be connected to the owning company, and a second edge of edge type "owned" would be connected to the subsidiary, owned, company.

In the embodiment of FIG. 1, node 110b represents a person. This node is a parent of nodes 110a and 110c, and if is not a child of any other node. Node 110d represents a university. This node is a parent of nodes 110c, 110e and 110f, and it is not a child of any other node. Node 110a is a child of node 110b, and represents the name of the person of node 110b. Node 110c is also a child of node 110b, and represents the employment status of the person of node 110b. Node 110c is also a child of node 110d, and represents that the university of node 110d has an employee. Node 110e is a child of node 110d, and represents the name of the university of node 110d. Node 110f is another child of node 110d, and also represents the name of the university of node 110d, but over a different time interval. Thus, the data structure 100 of FIG. 1 represents the following information, expressed in the English language: Mary Smith is the name of a Person, existing since (i.e. born on) Apr. 5, 1974, and presently still alive. This person was employed by a university between Apr. 1, 2002 and May 31, 2008. The name of the university was "State Polytechnic School" between the years 1855 through 1910. Beginning in 1911 to the present day, the university has the name "State Technical University."

Figure 2:
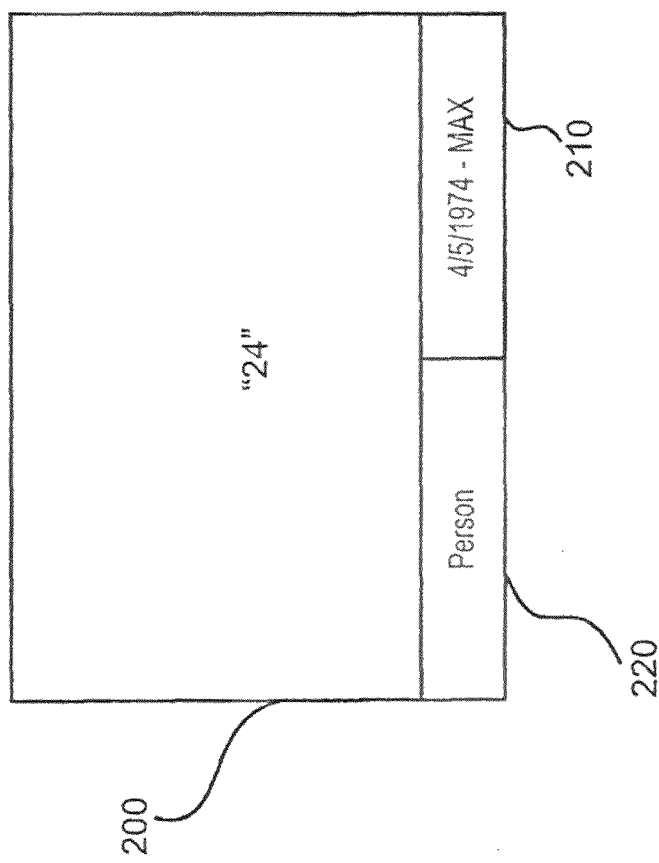
FIG. 2 is a graphical representation of a node in a journal data structure, according to an embodiment of the invention.

Turning to FIG. 2, in an embodiment of the invention each node 110 in the data structure 100 contains an information field 200, which holds one item of information. Each item of information is one fact about a real-world object. These real world objects can be physical objects, such as a person or a school or a company, or they can be intangible objects, such as a share of stock in a company, access permissions, or budget positions. The item of information can be a simple numeric identifier, used to distinguish one instance of the object from another. For example, if the object is a person, then the numeric identifier could simply signify that this object was person number 24 that was stored in the data structure. Additionally, the item of information can be a subsidiary fact, or detail, about a real world object. For example, the item of information could be the name of a person, the employment status of a person, the name of a school, the price of a particular company's stock, or any other fact about a real-world object. These subsidiary facts are generated as child nodes, preferably at the same time as the parent node representing the real-world object, to the extent that the subsidiary facts are known at that point. The information field 200 is assigned a data type, such as Integer, Double (a field capable of holding an integer twice as large as the integer type), String (a series of text characters), Date (a point in time), or Any (a type which uses serialized storable space to represent an arbitrarily large piece of data).

Each node 110 further contains a time of life field 210, which contains a time interval which represents the period of time that the information in the information field 200 is valid over. This time interval includes a beginning value and an ending value. If the time of life field 210 is capturing information relating to the present state of a real-world object, then the time of life field 210 can be set to a value which represents the current date and time, and is constantly updated as time passes. In the example of FIG. 2, the value "MAX" reflects that this node 110 captures the present state of the fact about the real-world object contained in information field 200. Alternatively, the ending value could be left blank.

For example, if an information field 200 in a node 110 contained a "person" item of information, then the time of life field 210 for that node 110 would contain a time interval representing when that person was alive. Thus, such a time interval would comprise the person's birth date and death date, or an indication such as "MAX" or a blank field, if the person was still alive. Similarly, if an information field 200 in a node 110 contained a "company stock value" item of information, then the time of life field 210 for that node 110 would contain a time interval representing the period of time for which that stock price value was valid. Thus, the time of life field 210 might indicate that the stock value for this particular company was valid beginning at 10:51 am on Jun. 4, 2010 and ending at 10:52 am on Jun. 4, 2010 (i.e. the price was valid for one minute). Lastly, each node 110 contains a type field 220, which records the type of information that is stored in the node. For example, the nodes 110 of FIG. 1 include node types of Person, Name, Employed, and University.

The ability to represent and capture the time of life for any given real world object is a useful part of modeling objects in the real world. The real world is constantly evolving over time, and information about real-world objects must be regarded relative to the time this information is valid. New real-world objects can come into existence at any moment and others can be destroyed or lost forever. This includes both physical objects, as well as the information connected to these physical object. For example, names and other attributes (value, temperature) constantly change over time. Additionally, Real-world objects can be related to each other for specific time intervals (e.g. ownership, marriage, dependencies), and then those relationships can change (e.g. change in ownership, divorce, children growing up and moving out of the family home).

In a preferred embodiment of the invention, the time of life of a child node 110 must always fall within the time of life of the child node's parent node 110. The time of life of the child thus must be entirely contained by the time of life of the parent. Thus, for example, if the parent node 110 contains a time of life field 210 which provides that the time of life of the information in the information field 200 of the parent node 110 is from Jun. 4, 2010 through Jul. 4, 2010, then any child node 110 to this parent node 110 must have a time of life which begins no earlier than Jun. 4, 2010, and ends no later than Jul. 4, 2010. If the child node 110 has a time of life which extends to (for example) Jul. 5, 2010, then this child node would be improper and invalid. Similarly, if this child node has a time of life which began (for example) on Jul. 3, 2019, this child node would be improper and invalid. Should such nodes be found in the data structure 100, they are preferably removed. Alternatively, such nodes could be identified as invalid and left in the data structure. Being identified as invalid, such nodes would not be searched, represented to the user as valid nodes, or be otherwise accessible.

Figure 3:
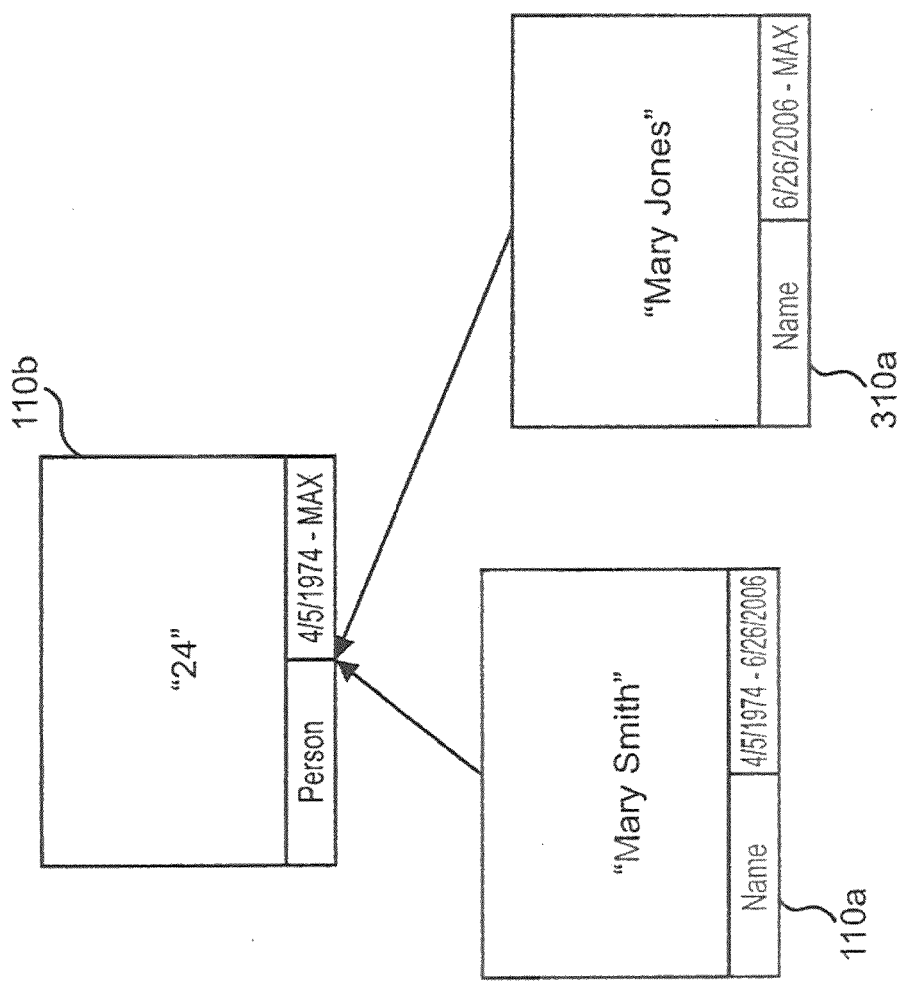
FIG. 3 is a graphical representation of an updated journal data structure, reflecting a change in the value of a piece of information for a real-world object, according to an embodiment of the invention.

Once the data structure 100 has been created, it may be updated as additional information about the real-world objects being modeled becomes known. Since the data structure 100 models real world objects, which exist over the course of various time intervals, and which change over time, the information stored about these objects must be updated to reflect these time-driven changes. In an embodiment, when the value of a particular fact, or information item, changes, a node 110 of the data structure 100 containing that fact is updated. Turning to FIG. 3, the data structure 100 is updated by locating the node who's value has changed, for example the node 110a containing the name of the person of node 110b. The time of life interval for the information item stored in the node 110a is updated, by recording the end date/time for the interval (which indicates the last moment in time that this value was still valid), in place of the "MAX" or blank entry or other indication that this node contained "live" as opposed to historical data. A new node 310a is then split off from the updated node 110a, which contains the new value for the fact, and a new time interval which begins at the same date/time that the prior time interval ended, and has "MAX" or blank entry or other indication that this node now contains the "live" value for this fact. For example, the new node 310a contains the changed value "Mary Jones", and a beginning date of Jun. 28, 2006, to reflect the fact that Mary Smith changed her name to Mary Jones on that date.

Preferably, information is never deleted from the data structure 100. Instead, when the values for facts recorded in the nodes 110 of the data structure 100 change, new nodes 110 are split off from existing nodes 110, as discussed above. If a previously unknown fact about a real-world object is discovered, then a new child node 110 is created to reflect that fact, and the current value for that fact. If available, the prior values for that fact may also be provided, as additional new child nodes 110 to the parent node reflecting the real world object. Alternatively, however, information may be removed from the data structure 100 entirely, for example to conserve space in the storage medium containing data structure 100, or to delete inaccurate information that should never have been recorded in data structure 100 in the first place.

Figure 4:
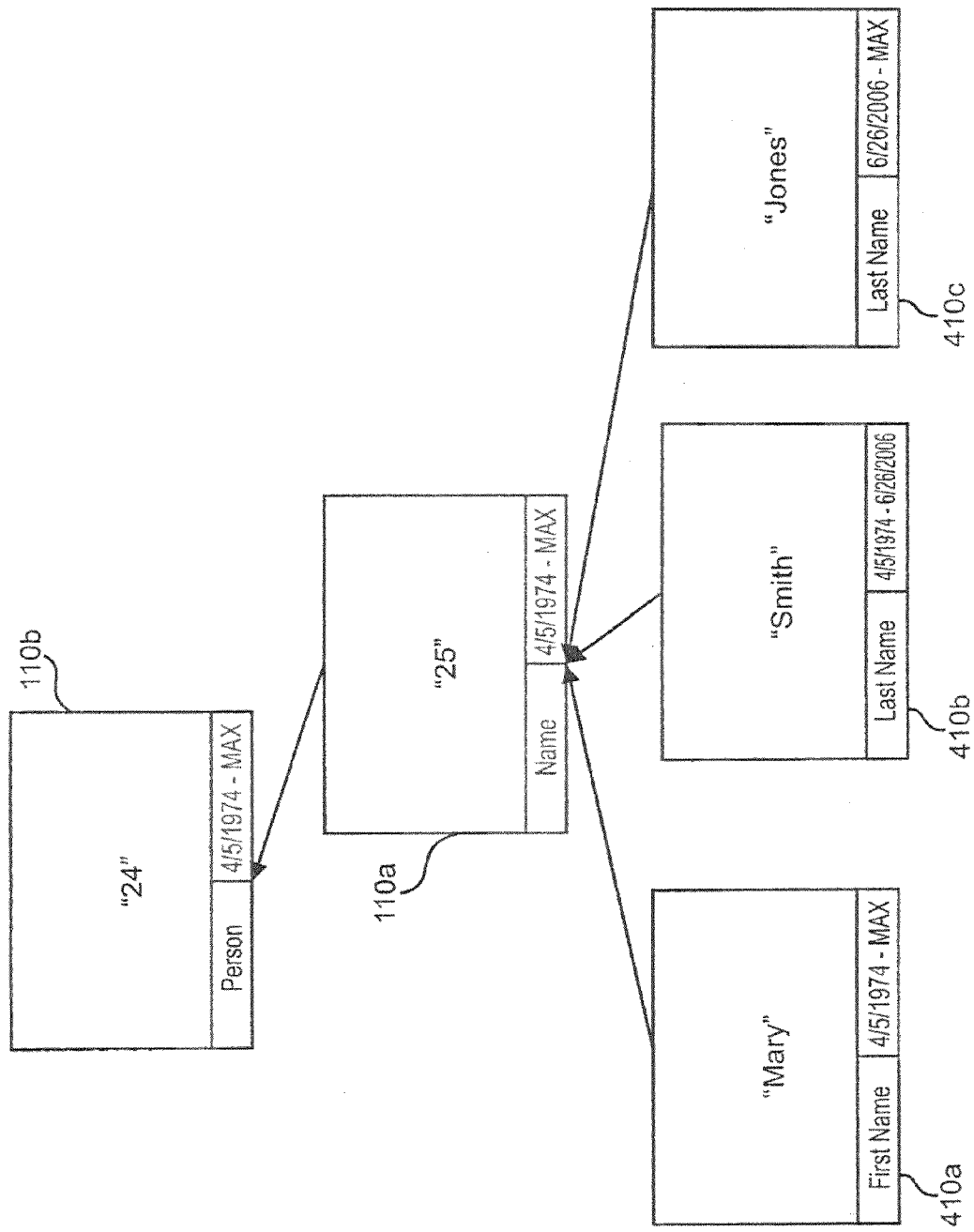
FIG. 4 is a graphical representation of an alternative type of journal data structure, according to an embodiment of the invention.

Note also that child nodes 110 may themselves have children. For example, the node 110a of FIG. 1 could itself have two child nodes 410a and 410b, as shown in FIG. 4. The child node 410a contains the first name of the person whose name is recorded in node 110a. The child node 410b contains the last name of the person whose name is recorded in node 110a. If this person's name changes at some point in time, that change can be captured, in detail, by the data structure 100. For example, if the person gets married on Jun. 26, 2008, and her last name changes from Smith to Jones, this change is captured by splitting off a new child node 410c, containing the new last name. The end of the time interval recorded in node 410b is then updated to "Jun. 28, 2008", and the beginning of the time interval in the new node 410c is similarly updated to "Jun. 26, 2006".

The data structure shown in FIG. 1 may be generated using computer language instructions recorded on a computer readable medium. Further details about computer readable media used in embodiments of the invention are discussed below. In an embodiment, the computer language instructions set forth in Table 1 are used to construct the data structure of FIG. 1. The instructions between the "local" instruction and the "do" instruction define the values "l_interval" (the time of life interval), "l_Journal" (the abstract interface to the journal structure), "l_person", "l_university", "l_person_name", "l_university_name", "l_employed" (the various nodes of the data structure). The computer Instruction at point (2) in Table 1 creates an empty journal data structure.

TABLE 1

```
feature -- Generation
    university_journal: ROSE_MEMORY_JOURNAL [ROSE_JOURNAL_ENTRY]
    is
    -- A memory journal with some data
local
    l_interval: ROSE_SIMPLE_CLOSED_OPEN_INTERVAL
    l_journal: ROSE_MEMORY_JOURNAL [ROSE_JOURNAL_ENTRY] -- (1)
    l_person, l_university, l_person_name, l_university_name,
    l_employed:
    ROSE_JOURNAL_ENTRY
do
    -- (2)
    create l_journal.make_empty
    -- (3)
    l_journal.register_entry_type ("Person")
    l_journal.register_entry_type ("Name")
    l_journal.register_entry_type ("Employed")
    l_journal.register_entry_type ("University")
    -- (4)
    l_journal.register_edge_type ("who")
    l_journal.register_edge_type ("by")
    -- (5)
    create l_interval.make (create {ROSE_DATE}.make_ccyymmdd
    (19740405),
    create {ROSE_DATE}.make_max_date)
    create l_person.make_new (l_journal, "Person", Void,
    l_interval)
    -- (6)
    create l_person_name.make_with_array (l_journal, "Name", <<
    l_person >>,
    l_interval)
    l_person_name.set_string_value ("Mary Smith")
    -- (7)
    create l_interval.make (create {ROSE_DATE}.make_ccyymmdd
    (18550101),
    create {ROSE_DATE}.make_max_date)
    create l_university.make_new (l_journal, "University", Void,
    l_interval)
    create l_university_name.make_with_array (l_journal, "Name",
    <<
    l_university >>, l_interval)
    l_university_name.set_string_value ("State Polytechnic
    School")
    -- (8)
    create l_interval.make (create {ROSE_DATE}.make_ccyymmdd
    (20020401),
    create {ROSE_DATE}.make_ccyymmdd (20080531))
    create l_employed.make_new (l_journal, "Employed", Void,
    l_interval)
    l_employed.add_parent_typed (l_person, "who")
    l_employed.add_parent_typed (l_university, "by")
    -- (9)
    l_university_name.split (create {ROSE_DATE}.make_ccyymmdd
    (19110101))
    l_university_name.set_string_value ("State Technical
    University")
    Result := l_journal
end
```

In this example, the data structure is created in the memory of a computer. Alternatively, the data structure may be created on a long-term storage medium, such as a hard drive, floppy disk, solid-state memory device, or similar devices. Where the data structure is created on a long-term storage device, it is preferable to store the data structure in a database. One example of such a database is the Microsoft SQL Server database, available from Microsoft Corporation, Redmond, Wash. Another example is the Oracle DBMS system, available from Oracle Corporation, Redwood Shores, Calif. Where the data structure is created in the computer memory, it may be persisted (i.e. a copy stored) out to a database, for long-term retention. Additionally, a hybrid implementation may be created, where the data structure is stored in a database on a long-term storage device, and a portion of the data structure is cached in the computer memory. This hybrid permits the use of a data structure that is too large to place entirely in the computer memory, while still realizing the performance benefits of in-memory operations. Any of a variety of known algorithms may be used to determine which portions of the data structure will be placed in the computer memory. One example is to use a Least-Recently-Used caching algorithm, wherein the node that has been accessed least recently is removed from the computer memory, each time that a new node needs to be loaded in from the long-term storage.

The computer instructions subsequent to (3) in Table 1 declare the types for each of the nodes in the data structure. Thus, these instructions create empty nodes for the "Person", "Name", "Employed" and "University" nodes shown in FIG. 1. The computer instructions subsequent to (4) in Table 1 declare the types for any edges which require type information. Thus, these instructions create edge types "who" and "by", which will be used for edges 122b and 122c in FIG. 1.

The computer instructions subsequent to (5) in Table 1 creates the "Person" node 110b of FIG. 1. The first instruction creates the start date for the time of life interval for the Person node 110b, with a start date of Apr. 5, 1974 ("19740405"). The second instruction sets the end date to the "MAX" date. In this way, the time of life interval reflects that the interval is still open, because the person defined in the Person node 110b is still alive. Once the person defined in the Person node 110b passes away, then the end date will be updated to reflect this fact. The third instruction creates the actual node 110b, labels it as a "Person" node, and associates the interval created above to the node 110b.

The computer instructions subsequent to (6) in Table 1 creates the "Name" node 110a, as a child of the Person node 110b. Since the Name node 110a is a child of the Person node 110b, it must, in a preferred embodiment, have a time of life interval that falls entirely within the time of life interval of the parent node 110b. Thus, the Name node 110a is created to have the same time of life interval as the parent node 110b. Alternatively, if it is known at creation time that the name of the person is no longer valid (i.e. the name is a prior name for the person, that has subsequently changed), then the time of life interval can be created with a different end date. Similarly, the time of life interval can be created with a different start date as well, to accurately reflect the historical state of when the person's name changed. The first instruction subsequent to (6) creates the Name node 110a, and also the directed edge 120a, which points to the parent node 110b. The second instruction sets the value of the Name node to "Mary Smith".

The computer instructions subsequent to (7) in Table 1 performs similarly as those discussed above, but creates the University node 110d, and the Name node 110e, reflecting the original name of the university, "State Polytechnic School." The computer instructions subsequent to (8) in Table 1 create the Employed node 110c. The first three instructions create the node 110c, setting the start and end dates for the interval and creating the empty node. The fourth and fifth instructions create the two directed edge types 122b and 122c, respectively. These directed edge types 122b and 122c reflect that the Employed node 110c has two parents, nodes 110b and 110d, each of which has a respective type of "who" and "by", to show the employed relationship as discussed above.

Finally, the computer instructions subsequent to (9) in Table 1 create the new, changed Name node 110f for the University node 110d. This new node 110f is created by splitting the original Name node 110e into two nodes. The original Name node 110e is modified, by the first instruction subsequent to (9), such that the end date for the time of life interval in the original Name node 110e now reads "Jan. 1, 1911". This end date is also used as the start date for the time of life interval in the new Name node 110f, which is also created by the first instruction subsequent to (9). The end date for the new Name node 110f retains the value "MAX" from the original Name node 110e that it was split off from. The second instruction sets the value for the new Name node 110f to "State Technical University", to reflect this change in the value of this real-world fact about the university of node 110d.

To improve performance, particularly when searching for a particular node 110 in the data structure 100, indexes can be created on the data structure 100. For example, an index can be created for ail of the Name nodes in the data structure 100. The index is preferably stored in memory, and comprises a list of all of the Name nodes in the data structure 100, along with a value that identifies the parent node for the Name node. Thus, the index entry for the Name node 110a, would contain the value "Mary Smith" and a value that identifies (i.e. points to) the Person node 110b. This allows a user to rapidly search the index of Names for the name "Mary Smith", and be directed to the node 110b which represents that person. The index may be configured such that an index entry is automatically added to the index each time a Name node is added to the data structure 100. Similarly, the index miry for a Name node may be automatically removed when the corresponding Name node is removed from the data structure 100. Alternatively, these indexes may be configured such that some or all index updates must be performed explicitly on the index.

For an in-memory implementation of the data structure 100, a hash table may be used to store and access the index entries. To remove entries from an in-memory index, it is preferable to use a deletion counter in the data structure 100. The deletion counter allows other implementations that are storing data related to the journal data structure to detect when they are required to re-visit the data structure. For example, an external index needs to detect when the target of the index has been removed from the journal. The external index can defect when this index target has been removed by inspecting the deletion counter for the data structure 100, to see that something has been deleted. The data structure 100 is then visited to determine what has been deleted and whether that deletion requires a change to be made to the external index. Alternatively, the data structure 100 could send a notification to the index whenever a node 110 is removed from the data structure 100.

For an implementation of the data structure 100 using a database, an additional table in the database is created, which holds the index. This index table is preferably configured in the database such that when a node 110 is removed from the database, the corresponding index entry in the index table is automatically also removed. This feature is known in the database art as a "cascading delete".

To improve security of the data structure 100, a permissions manager is preferably provided, which restricts the ability of users to access, read or write information In the data structure 100. Preferably, the permissions manager stores for each node 110 an associated list of users, or groups of users, who are allowed to read the information in the node 110, and a list of users or groups of users who are allowed to write/modify the Information in the node 110. In this way, a subset of the data structure 100 may be easily created for any given user, which contains only those nodes 100 that the user is permitted to read (or write to). Preferably, no modifications need to be done to the data structure 100 itself, to support permissions. The permissions manager works as an add-on to provide this functionality. Similar to the data structure 100, the permissions manager can be implemented as an in-memory module, which maintains the access lists in the computer memory, and optionally persists those lists off to a storage medium. Alternatively, the permissions manger can maintain the access lists in a database, and access those lists as needed during operations. The hybrid form of the data structure 100, as discussed above, can also be extended to the permissions manger, such that the portions of the permissions manager that relate to nodes 110 which are brought into the computer memory are themselves brought into memory, while the rest of the permissions manager resides in the database. The permissions manager information can be replaced using the same cache replacement algorithms discussed above.

Figure 5:
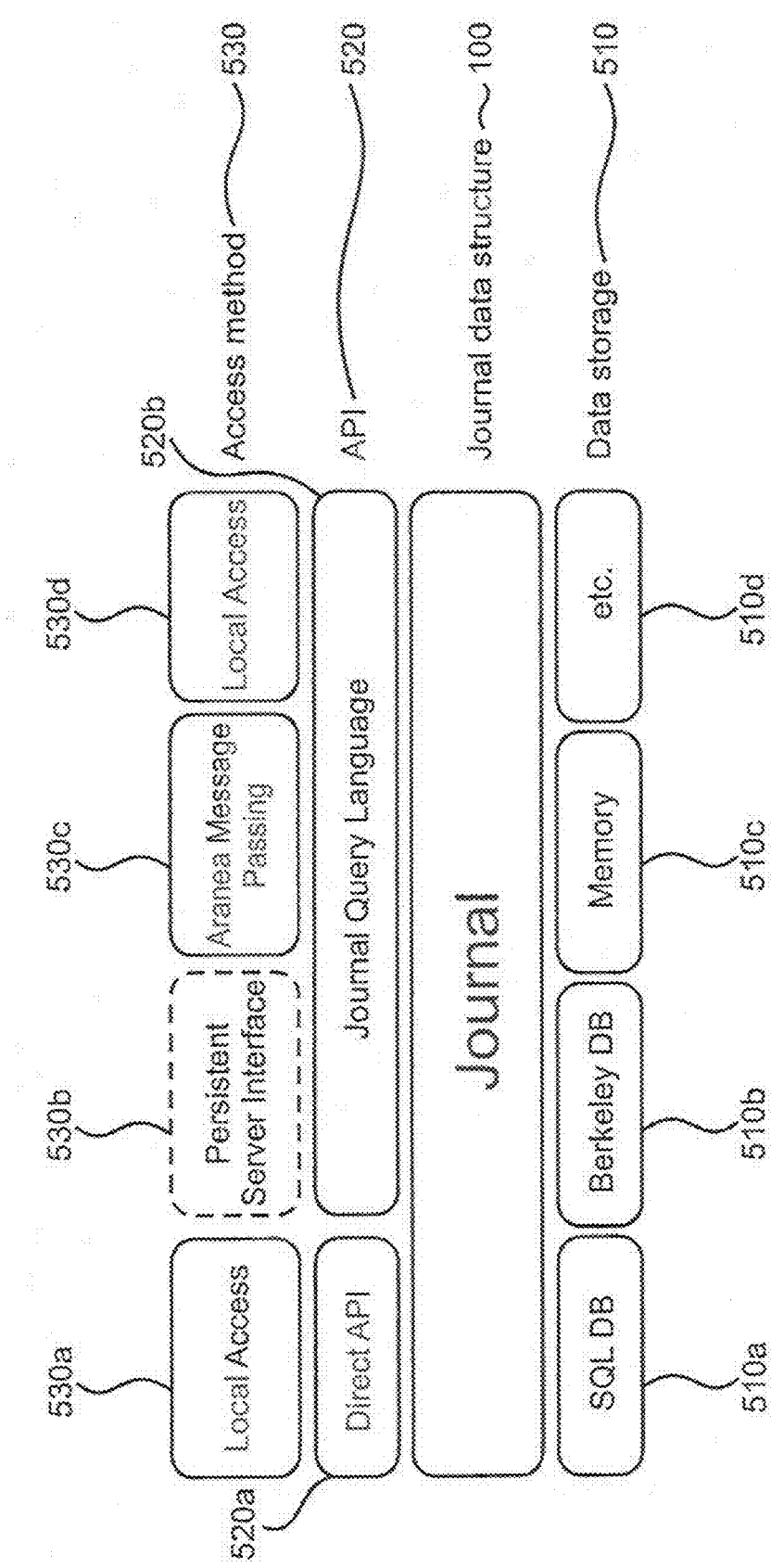
FIG. 5 is a representation of the architecture of a system using a journal data structure, according to an embodiment of the invention.

The architecture of a system of an embodiment which uses the data structure 100 is shown in FIG. 5. The data structure 100 ("Journal data structure") sits above a data storage layer 510 of the system architecture, and below an application programming interface ("API") layer 520 and an access layer 530. The data storage layer 510 of an example system comprises a variety of different data storage systems 510a-d. Data storage system 510a is a Microsoft SQL Server database, available from Microsoft Corporation, Redmond, Wash. Data storage system 510b is a Berkeley DB database, available from Oracle Corporation, Redwood Shores, Calif. Data storage system 510c is the memory of the computer on which the systems is running (i.e. an in-memory storage system). Data storage system 510d is some other data storage system, such as Postgres SQL, available from Postgres SQL, at www.postojesql.org, or any of a wide variety of known database platforms. In this example, the data structure 100 can use any or all of these different data storage systems to store the information recorded in the data structure 100. The particular data storage system chosen for use is a design choice for those of skill in the art, dependent on the particular implementation that is desired, and on the nature of the information that is being manipulated, and is not critical to the disclosed embodiments of the invention. For example, where the information being manipulated has already been collected and is being maintained in a variety of different data storage systems, the computer on which the data structure 100 resides can simply read the information from each of those systems, present it in the data structure 100, and then write the information back into each of the respective systems from whence it came. Alternatively, the computer can read the data from the plurality of databases, transform the data info the data structure 100, and then store the entire data structure 100 into a single data storage system for further use. Other variations are also possible.

In an embodiment, the data structure 100 is accessed according to a variety of APIs 520a-b. The data structure 100 may be access using the API 520a, which is an object-oriented API that permits a programmer or other person with some technical skill to navigate through the nodes and edges of the data structure 100. The API 520a may be used directly by the programmer to traverse the data structure 100 in real time, or alternatively may be used by other computer programs which are written to perform specialized actions on the data structure 100, such as reading certain specific desired information, or writing certain specific information into the data structure 100. The details of these actions and computer programs are design choices for those of skill in the art, depending on the precise actions that are desired for particular circumstances (e.g. types of information, needs of the user community, etc.), and are not critical to the invention.

The data structure 100 may also be accessed by the query language API 520b. Further details about the query language API 520b will be discussed below. Finally, the data structure 100 may also be accessed using an internal API (not shown in FIG. 5), which permits the user to modify the data structure 100 directly. This API is intended for use by developers, or system administrators, or others who require low-level access to the data structure 100, typically for purposes of testing, debugging, or other administrative tasks.

The uppermost layer of the architecture of FIG. 5 is the access layer 530. The data structure 100 may be accessed in a variety of manners. Local access 530a represents computers or other data access points (terminals, touch screens, etc.) which are local to the computer system on which the data structure 100 is maintained. Persistent server interface access 530b implements access to the server using a client/server architecture and a dedicated network connection. In addition to permitting local access to the data structure 100, the architecture of FIG. 5 also permits remote access to this data structure. Preferably, remote access is performed using the query language API 520b, as opposed to the direct API 510a, or other APIs. Using the query language API 520b permits the remote user to use a query that retrieves ail of the desired information at once, and transmits that information to the remote user's computer. This reduces inefficiencies, both in data transmission (i.e less traffic on the network connecting the remote user to the data structure 100), as well as in interactions with the data structure 100, which might be negatively impacted by the inefficiencies inherent in remote access (such as network delay, dropped signals, etc.) to cause undesired effects on other users of the data structure 100. In the example of FIG. 5, the remote access to the data structure 100 is provided by the Aranea message passing framework 530c (available from Aranea, at http://aranea.origo.ethz.ch), built on top of the Apache Active MQ framework (available from the Apache Software Foundation, at http://www.apache.org). Other remote access solutions are also possible.

Figure 6:
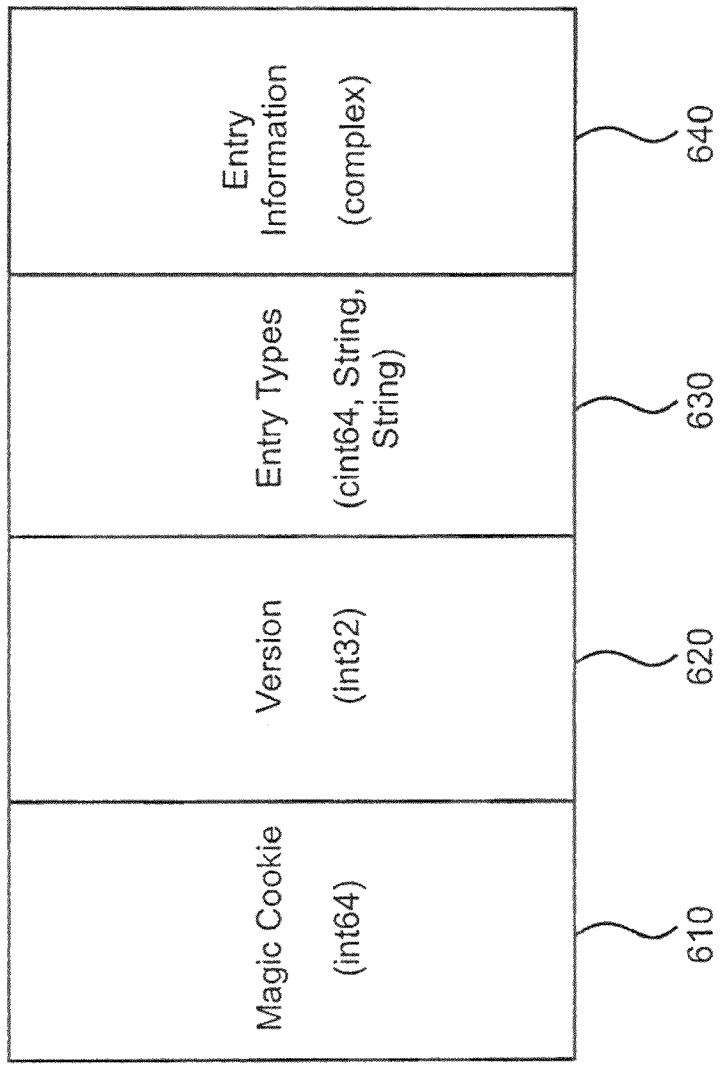

In an embodiment, when storing the information in the data structure 100, as well as when transmitting the information to remote users, a compact, language-independent packet 600 for storing the data is used, as shown in FIG. 6. The format for this packet 600 is space-efficient, and contains version information (versioning will be discussed in additional detail below). The data packet 600 comprises, for each node 110 or edge 120 that is being stored, a first block 610, which comprises a 64-bit integer that stores a universal value to allow programs to identify the file as a file containing stored journal data. The second block 820 comprises a 32-bit integer value containing the version information for the node 100 or edge 120. The third block 630 comprises a sequence of a 64-bit integer, and two String values, which store type ids, names and descriptions of the entry types contained in the journal. This information is used to relate types and names. The description string contains useful information about the type and serves self-documenting purposes. The fourth block 840 comprises a block for each entry in the journal, containing the id, type, value, timestamp and a list of all children and parent ids, including the edge types. For example, for node 110a, the fourth block 640 would contain an entry with the value "Mary Smith", the type id for name (as found in block 830) and the corresponding relations for that type.

In order to reduce the space consumed by the data structure 100 when it is stored or transmitted, the data packet 800 uses compressed integers whenever possible. Furthermore, the nodes 110 of the data structure 100 are preferably stored in topological order with parents always appearing before children in the sequence of entries, so that the information about the parent/child relationships (i.e. the edges 120) only has to be stored once, rather than twice (once for each end of the edge 120). The data packet 600 does not use termination characters, as these characters consume space. Instead, the data format uses the pattern <size><actual data>, where <size> references the size assigned to each block 610-640 in the data storage packet 600, and <actual data> is the actual information, stored immediately subsequent to the size information.

As discussed above, the data structure 100 is preferably accessed through use of a query language. Use of a query language means that the user need not write separate computer language code each time the user wishes to perform search and retrieval tasks. Instead, the user merely expresses the information the user wishes to retrieve, using a statement known as a query, in the specialized query language, and provides that query to the data structure 100 via the query language API 520b of FIG. 5.

In an embodiment, the query language is based on set-theory and projection. This means that one starts from a set of nodes 110 in the data structure 100, and then uses projections of those nodes 110, to retrieve parents or children of the starting set of nodes 110. Finally, one applies filters to derive the desired set of nodes 110 from the projection set forth in the query. Queries may be written directly in code, or alternatively the queries may be expressed in an independent textual representation, which facilitates communication, modeling and debugging of the queries. A grammar for a query language of an embodiment of the invention is set forth in Table 2:

TABLE 2

Query Language Grammar

| | |
|---|---|
| Q -> union(q1:Q,q2:Q) | -- Union of q1 and q2 |
| \| intersection(q1:Q,q2:Q) | -- Intersection of q1 and q2 |
| \| subtract(q1:Q,q2:Q) | -- Remove all entries in q2 from the entries in q1 |
| \| on(q:Q,d:D) | -- Restrict to entries on date d |
| \| of_type(q:Q,t:T) | -- Restrict to type t |
| \| has_value(q:Q, v: ANY) | -- Restrict to entries that have a specific value |
| \| above(q:Q) | -- All parent entries of the entries in q |
| \| below(q:Q) | -- All child entries of the entries in q |
| \| everything | -- All entries |
| \| entry(e:E) | -- The single entry e |
| \| entries(l:L) | -- The explicit list of entries l |
| \| before(q:Q,d:D) | -- Restrict to entries before date d |
| \| after(q:Q,d:D) | -- Restrict to entries after date d |
| \| between(q:Q,d1:D,d2:D) and date d2 | -- Restrict to entries between date d1 |
| \| ge_integer (q: Q, i: INTEGER) integer value >= v | -- Restrict to entries with |
| \| le_integer (q: Q, i: INTEGER) integer value <= v | -- Restrict to entries with |
| \| ge (q: Q, v: ANY) | -- Restrict to entries with value >= v |
| \| le (q: Q, v: ANY) | -- Restrict to entries with value <= v |
| \| store_in_result (q: Q) | -- Store the result of Q in the main result (these entries will always be part of the result!) |
| \| range_start_date_increasing (i,j: INTEGER, q:Q) -- sort the Result of q by start date increasing and filter the entries with index >= i and < j in this order. | |
| \| range_start_date_decreasing (i,j: INTEGER, q:Q) -- sort the Result of q by start date decreasing and filter the entries with index >= i and < j in this order | |
| \| range_end_date_increasing (i,j: INTEGER, q:Q) -- sort the Result of q by end date increasing and filter the entries with index >= i and < j in this order | |
| \| range_end_date_decreasing (i,j: INTEGER, q:Q) -- sort the Result of q by end date decreasing and filter the entries with index >= i and < j in this order | |
| \| range_value_increasing (i,j: INTEGER, q:Q) -- sort the Result of q by value increasing and filter the entries with index >= I and < j in this order | |
| \| range_value_decreasing (i,j: INTEGER, q:Q) -- sort the Result of q by value decreasing and filter the entries with index >= I and < j in this order | |

Figure 7:
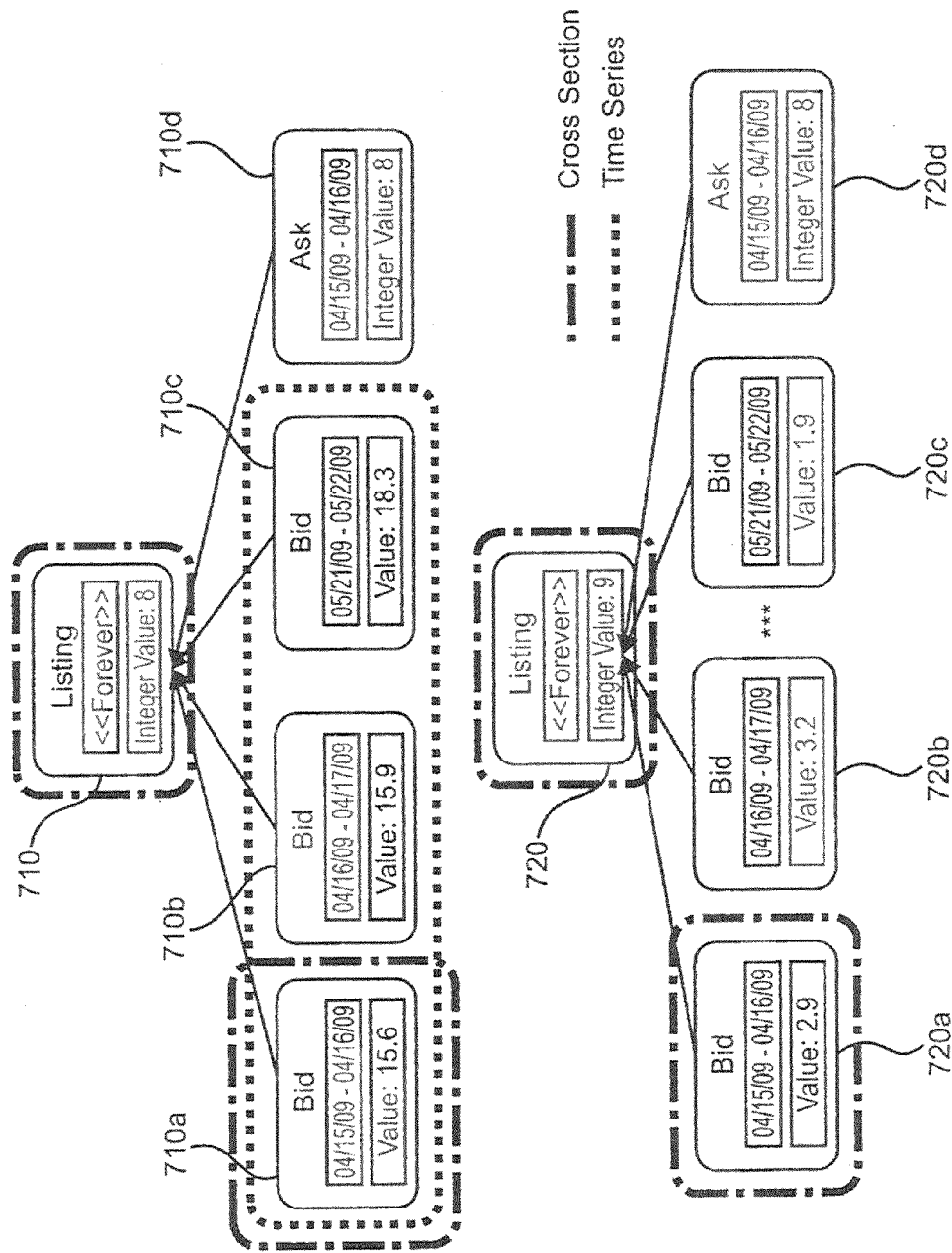
FIG. 7 is a representation of a journal data structure reflecting stock transactions for a company's stock, according to an embodiment of the invention.

An example of a query, with reference to the data structure 700 shown in FIG. 7, will now be discussed. If the user wishes to retrieve a time-series of all of the "bid prices" for a particular company's stock, where the desired company had an identifier of "8", the user would craft the following query using the query language:

```
l_query := everything.of_type ("listing").
           has_value (8).below.of_type ("bid")
```

The first line of this query states that the first step is to retrieve the entire data structure 700 ("everything"). Then, the data structure is filtered to select only those nodes in the data structure having a type of "Listing" (of_type("listing")). This yields nodes 710, 720, a list of companies that are listed on the exchange in question (e.g. the NYSE or NASDAQ). Since only the company having an identifier of "8" is desired, the set of nodes is further restricted to node 710, having an identifier value of "8" (has_value(8)). Since the bid prices for a company's stock will be stored below the company, as children of the listing node, the query then retrieves all of the children 710*a-d* of the node 710 for the desired company (below). Finally, this set of children is further filtered to select only nodes 710*a-c*, those children which are of the type "bid" (of_type("bid")). This set of nodes, containing all of the bid prices stored in the data structure for the stock of company "8", is returned to the user.

In actual practice, the above query preferably would be optimized before it is executed, such that if does not actually retrieve the entire data structure as the first step. The above query will first be translated into a format recognized by each data storage system 510 on which desired information is stored. For example, the query will be translated into a SQL statement for execution on the MS SQL DB 510*a* or the Berkeley DB 510*b*, or will be translated into other types of statements for other storage system types. Each data storage system 510 will typically have its own mechanisms for optimizing queries on the database. These optimizers will receive the SQL statement or other similar statement, and will compute an optimized data retrieval statement specific to the particular data storage system being accessed.

Similarly, again with reference to the data structure 700 of FIG. 7, a query that seeks a cross-section of bid prices for all listings, on a particular day, would be expressed as follows:

```
l_query := everything.of_type ("listing").
           store_in_result.below.of_type ("bid")
           on_date (create {DT_DATE_TIME}.make (2009, 4, 15, 0, 0, 0))
```

This query retrieves the listings nodes 710, 720, as discussed above. It then stores each of these listings in the result set of nodes, so that the ultimate retrieved bid values can be correlated to their associated listings (i.e. companies). The bid price nodes 710*a-c* and 720*a-c* are then retrieved, and these nodes are then filtered to identify only nodes 710*a* and 720*a*, those with bid prices which fall on a specified date (Apr. 15, 2009). Similarly, if a range of dates were desired, then the query would be drafted to specify both a starting date and an ending date.

Figure 8:
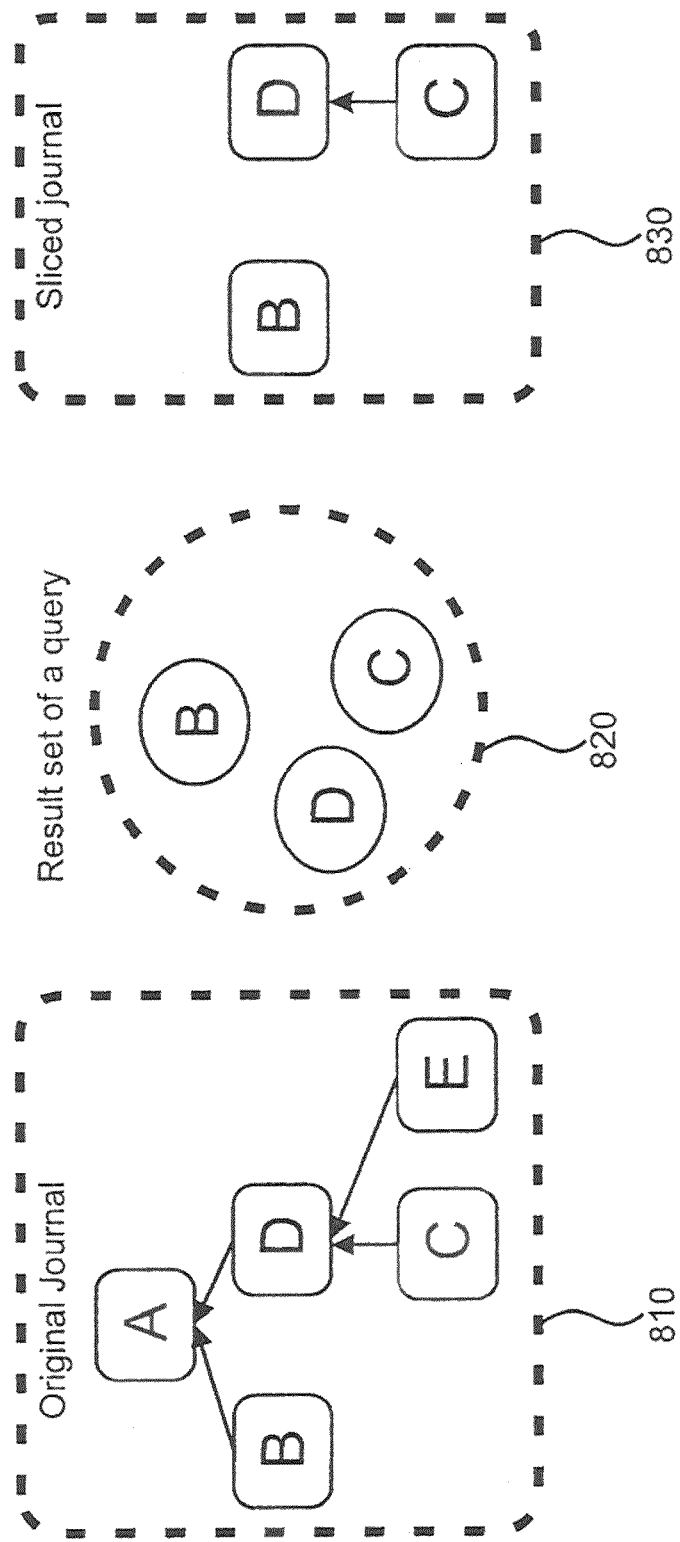
FIG. 8 is a representation of a data storage format, according to an embodiment of the invention.

The result of a query to the data structures of an embodiment of the invention is always a set of nodes from those data structures. Thus, if the edges in the data structures also convey useful information to the user, then the query results can be presented to the user as a subset of the data structure that was queried. For example, turning to FIG. 8, the original data structure 810 is queried. The query results 820 are returned to the user. These query results 820 are then expressed as a subset, or slice 830, of the original data structure 610.

Figure 9:
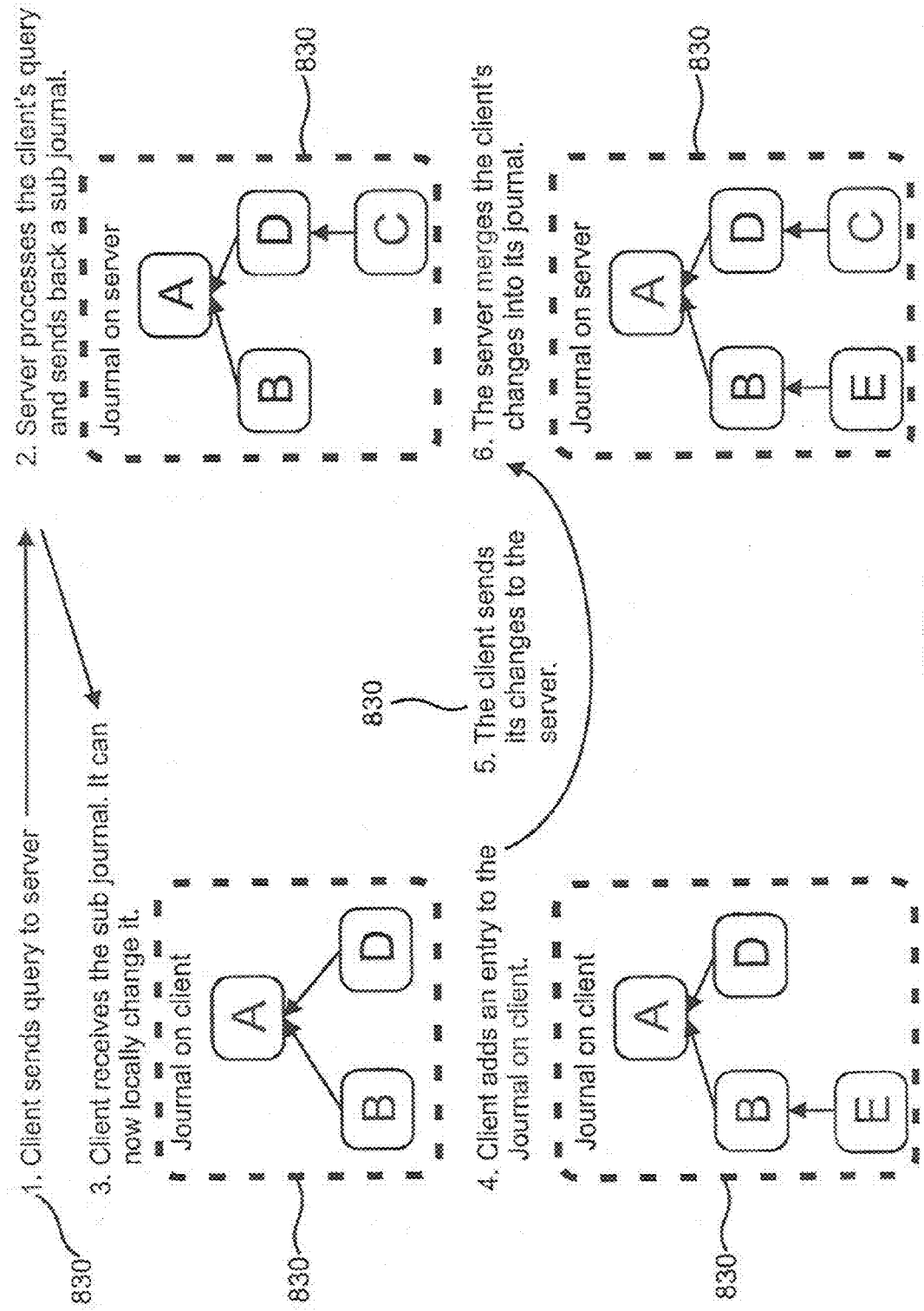
FIG. 9 is a representation of a method of updating a journal data structure, using a client/server implementation, according to an embodiment of the invention.

The query language may also be used to make changes to the data structures of an embodiment of the invention. This is particularly useful where the user making changes is a remote user, as discussed above, and does not have access to the direct API 520*a*, to directly access the data structure. With reference to FIG. 9, the user first submits a query to the server hosting the data structure, at step 910. This query specifies the portion of the data structure that the user wishes to modify. At step 920, the server executes the query and identities the slice requested by the user. At step 930, the server returns to the user the desired slice of the data structure. For example, the data structure on the server comprises nodes A, B, C and D, related as shown in FIG. 9, step 920. The slice returned to the client, however, is just the nodes A, B and D, and the relations between those nodes, as shown in FIG. 9, step 930. At step 940, the user modifies the slice by adding an entry E to the slice. At step 950, the user transmits the slice back to the server, and tells the server that this slice has been changed. At step 960, the server merges the client's changes into the data structure, by inserting any new nodes or edges into the appropriate location within the data structure, by removing any nodes or edges deleted by the client from the data structure, and by updating the information in the nodes or edges, as changed by the client.

Before permitting the changes to be merged into the data structure, the server checks to confirm that the merged structure does not violate the fundamental rules for the data structure. Thus, the server confirms that: 1) the user did not add an edge to a node that had been removed by another user; 2) the user did not add an edge that creates a cycle in the data structure (recall that the data structure is a DAG, which is not permitted to have cycles in if, as discussed above); 3) the user did not change a node, either by altering the information stored in the node, or altering the time of life interval for the node, where another user had already made a change to this information or interval, or removed the node entirely; or 4) the user did not remove a node, where another user had made a change to the node (either information or interval values).

The server can similarly test for other conflicts, as desired by the designer of the system using the data structure. For example, the server can test for inconsistent or conflicting data, within the implantation-specific rules for a particular database. Thus, if a particular database has a rule that each Person object can only have one Name object valid at any given time, a Person object having two Name objects that are valid at the same time (i.e. a person with two names) would be reported as a conflict. Similarly, if a particular database has a rule that a Company can only have a single Closing Stock Price for any given date, a Company object having two Closing Stock Price objects that are valid on the same dat would be reported as a conflict. These types of conflicts are implementation-dependent, and will vary depending on the specific database created by the designer of the system using the data structure.

An additional feature implemented in an embodiment of the invention is to keep track of multiple versions of the data structure. Versioning is implemented by associating a version number interval with each node or edge of the data structure. This version number interval specifies the range of versions of the data structure over which this version of the node or edge is valid, Whenever a change is made to a node or an edge of the data structure, the old version of that node or edge is not deleted, instead is it marked with the last version for which that node is valid, and a new version of that node or edge is created with the changed data, and an indication of the earliest version for which the new node is valid. This is conceptually distinct from splitting a node at a time of life point when the information in the node changes. While the time information in an entry indicates the time period over which the value of an entry was valid, the version information is used to identify what information was available in the data structure 100 at a given point in time. When considering the data structure 100 as a model of the real world, the version thus expresses a belief as to what was real at a given point in time (recognizing, of course, that the data is frequently incomplete and inaccurate, for models that are complex enough to be useful).

After the change, the prior version of the node will have an indication of which version or versions of the data structure that node is valid for, and the current version of the node will have an indication of the earliest version that the current version of the node is valid for. When it is desired to see what the data structure looked like as of any given prior version, a query is simply run on the data structure, using the version number of the desired version. This query will return ail nodes and edges that were valid for the requested version number. When it is desired to run any query on the current version of the data structure, then the current version number would be either implicitly or explicitly provided as an additional query parameter.

Preferably, versioning is linear. When an old version of the data structure is accessed, that data is only readable, not writeable. This avoids the undesired creation of branches of the data structure, if, however, it is desired to create a branch, then the old version of the data structure can be copied into a new data structure, which would be modifiable.

Figure 10:
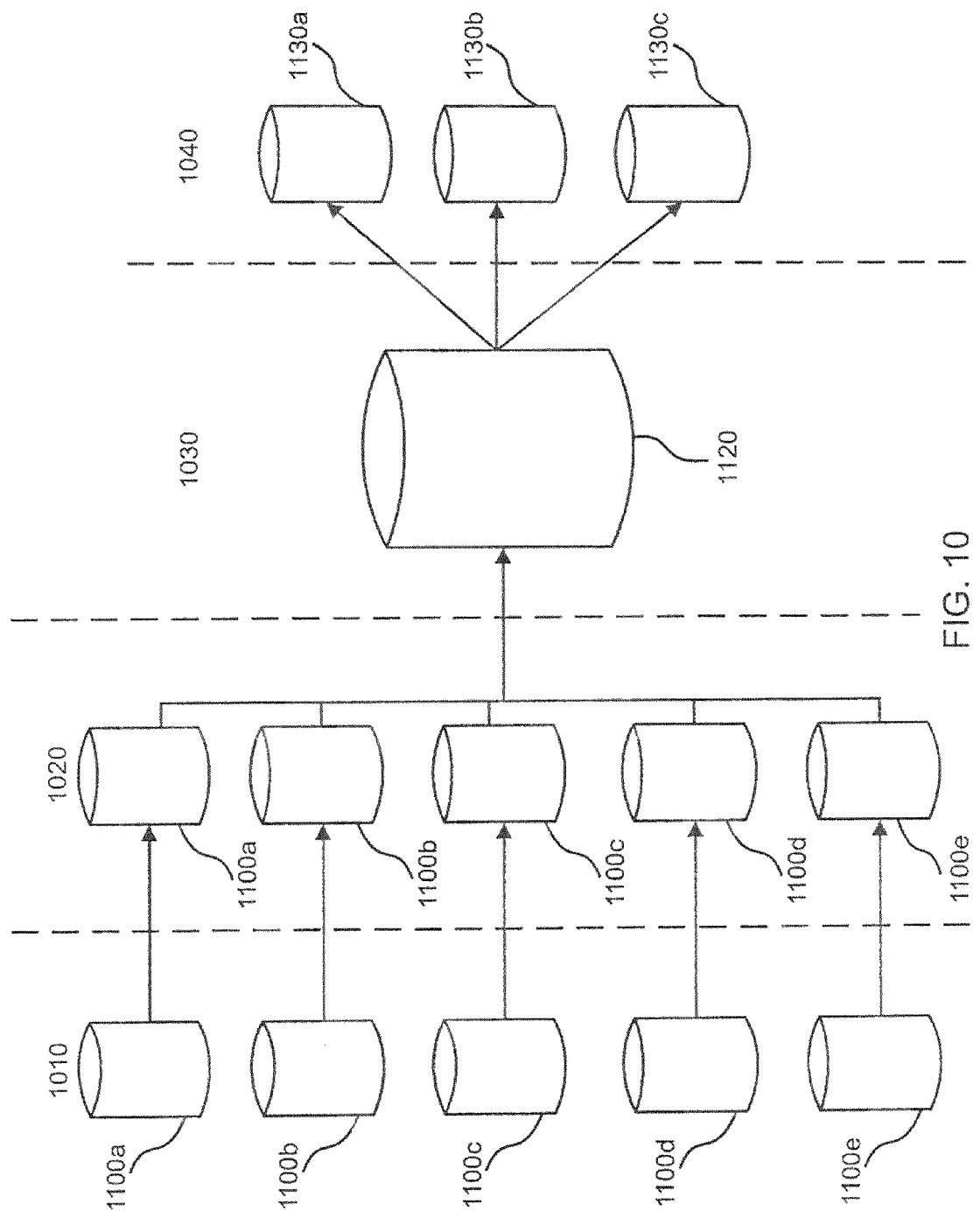
FIG. 10 is a representation of a method of using the journal data structure of an embodiment of the invention to transform a plurality of legacy databases into a combined database with the journal data structure.

A particular use of the data structure of an embodiment of the invention, to transform legacy databases into a more useful format, will now be discussed, with reference to FIG. 10. In the example of FIG. 10, a user has a collection of legacy databases 1010*a-e*, each of which contain some information of value to the user, but each of which stores this data in different incompatible formats. For example, the databases 101*a-e* may each contain worldwide stock market data from different providers of such information. Database 1010*a* may be a database of information from Reuters®, Database 1010*b* may be a database of information from Bloomberg®. Database 1010*c* may be a database of information from the Wall Street Journal®. Databases 101*d-e* may be information from other financial information providers.

The user wants to conduct research on a particular segment of the worldwide financial market, for example by examining stock prices on the various Asian stock exchanges (Tokyo, Taiwan, Singapore, etc.). The databases 101*a-e* contain all of the information the user desires, but this information is difficult to access, and difficult to compile, because it is stored in different databases each with its own formats. Furthermore, each database has a mass of information relating to non-Asian markets, that the user does not wish to examine. In an embodiment of the invention, the user uses the data structure of an embodiment to transform these legacy databases into a database containing the information the user wishes to examine.

Beginning at step 1100, the user collects the legacy databases 1010*a-e*. At step 1110, the user migrates each of these databases into a data structure of an embodiment of the invention. Each item of information stored in each of the legacy databases 1010 is migrated into a node of a data structure of an embodiment of the invention, and assigned a appropriate time of life interval. For example, the data stored in a record as shown in FIG. 11*a* would be migrated into the data structure as shown in FIG. 11*b*. The company information from Reuters describes a company (ABC Corp.) and the current number of shares in the market (2,000,000). This information is migrated into a parent node 1140 for the company, with a child node 1150 describing the company name, and a child node 1180 describing the number of shares, to model this relationship. The time of life interval for each of the nodes 1140, 1150 and 1180 is set to reflect a beginning point of the earliest date the information is known to be valid. For example, if the record in the legacy database has an explicit date such as a "date created" or "date modified" value, that value is used. Alternatively, the date that the database was created can be used if it is accurate as to the records in the database. The ending point for the time of life interval is set to the latest date the information is known to be valid. If the information is current, then an identifier such as "MAX" as discussed above can be used, or the field can be left blank, if the legacy data contains an explicit expiration date, then this date can be used. A similar process is performed on each of the other databases 1010, This process can be an on-going, real-time migration. For example, referring to the example of FIGS. 11*a-b*, in a Reuters update (shown in FIG. 11*c*), a 2-for-1 split of the company shares is announced, such that there are now 4,000,000 shares in the market. This update is migrated info the data structure of an embodiment of the invention, as shown in FIG. 11*d*, and leads to creation of a child node 1170 to the parent company node 1140, having the new amount of shares in the market. The old child node 1180 has its time-of-life interval adjusted to be limited to the point when the split was announced.

Then at step 1120, each of the data structures created from each of the legacy databases at step 1110 is merged into a single data structure 1030 according to an embodiment of the invention, using the merging process discussed above. This single larger data structure 1030 now contains all of the information from each of the legacy databases, represented as one large data structure, having time of life intervals as discussed above. The real-time migration discussed with reference to FIGS. 11*a-d* may also be performed on the larger data structure 1030, if desired. Finally, at step 1130, a query is executed on the data structure 1030, to extract out the desired information, into a slice data structure 1040. Thus, in the example above where the user wishes to examine Asian stock market information, the user would run a query on the data structure 1030, specifying that the user wanted all information for the desired Asian stock exchanges (e.g. Tokyo, Taipei, Singapore, etc.). This data would be returned as a slice 1040*a*, which the user could then further examine. Similarly, other users could construct other slices of this data, such as data on the NASDAQ market, or the various European markets. This information is amalgamated from a wide variety of proprietary formatted legacy databases, using the data structure of an embodiment of the invention, in a manner that permits easy access to the entire universe of desired data.

Computer System Architecture Overview

Figure 12:
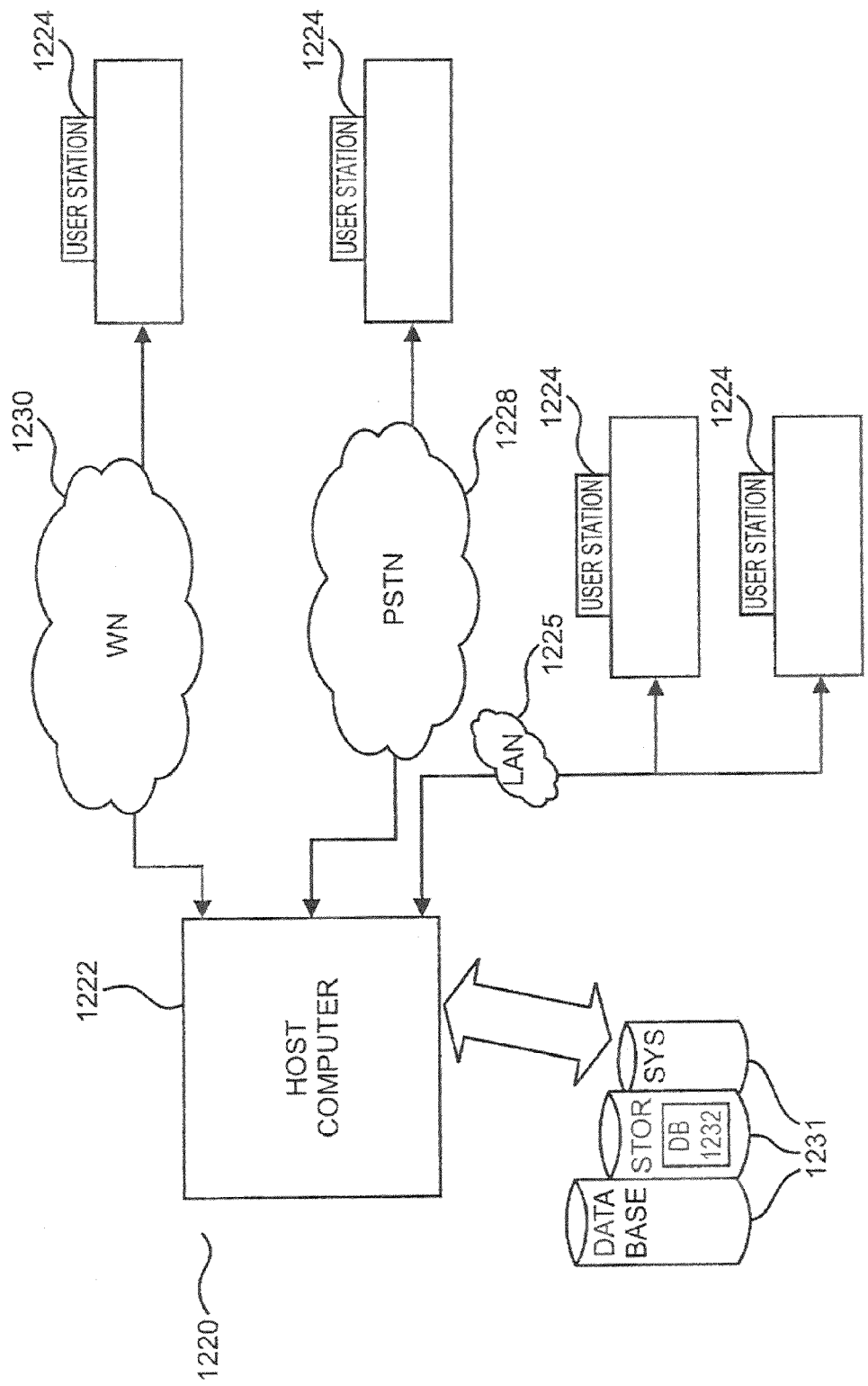
FIG. 12 is a computer system on which the journal data structure of an embodiment of the invention is stored and manipulated.

In an embodiment, the components of the apparatus discussed in the embodiments above reside in a computer system, which has been configured using the above-described components to create a special-purpose apparatus for storing and processing data having specified time of life intervals, using the data structure 100 as discussed above. Referring to FIG. 12, in an embodiment, a computer system 1220 includes a host computer 1222 connected to a plurality of individual user stations 1224. In an embodiment, the user stations 1224 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 1224 are connected to the host computer 1222 via a local area network ("LAN") 1225. Other user stations 1224 are remotely connected to the host computer 1222 via a public telephone switched network ("PSTN") 1228 and/or a wireless network 1230.

In an embodiment, the host computer 1222 operates in conjunction with a data storage system 1231, wherein the data storage system 1231 contains a database 1232 that is readily accessible by the host computer 1222. The database 1232 in an embodiment contains the data structure 100, as discussed above, and permits access to it. In an alternative embodiment, the data structure 100 is stored in a computer memory while in operation, and is then persisted to the database 1232.

In alternative embodiments, the data storage system 1231 and/or database 1232 may be resident on the host computer, stored, e.g., in the host computer's ROM, PROM, EPROM, or any other memory chip, and/or its hard disk, in yet alternative embodiments, the database 1232 may be read by the host computer 1222 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 1222 can access two or more databases 1232, stored in a variety of mediums, as previously discussed.

Figure 13:
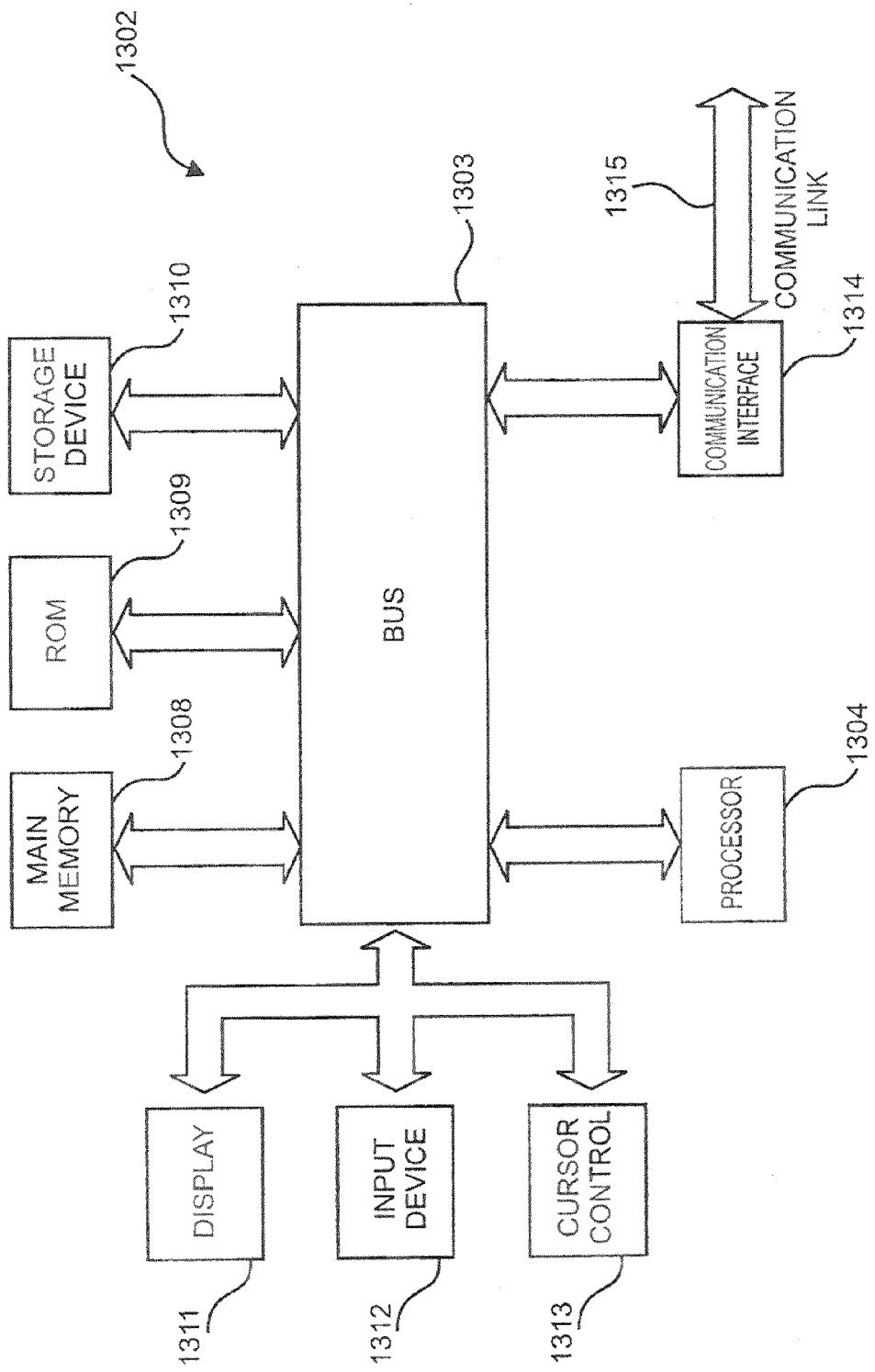
FIG. 13 is a processing unit belonging to the computer system of FIG. 12.

Referring to FIG. 13, in an embodiment, each user station 1224 and the host computer 1222, each referred to generally as a processing unit, embodies a general architecture 1302. A processing unit includes a bus 1303 or other communication mechanism for communicating instructions, messages and data, collectively, information, and one or more processors 1304 coupled with the bus 1303 for processing information. A processing unit also includes a main memory 1308, such as a random access memory (RAM) or other dynamic storage device, coupled to the bus 1303 for storing dynamic data and instructions to be executed by the processors) 1304. The main memory 1308 also may be used for storing temporary data, i.e., variables, or other intermediate information during execution of instructions by the processors) 1304. In an embodiment, the main memory 1308 contains the data structure 100, and permits users to access this data structure as discussed herein.

A processing unit may further include a read only memory (ROM) 1309 or other static storage device coupled to the bus 1303 for storing static data and instructions for the processor(s) 1304. A storage device 1310, such as a magnetic disk or optical disk, may also be provided and coupled to the bus 1303 for storing data and instructions for the processor(s) 1304.

A processing unit may be coupled via the bus 1303 to a display device 1311, such as, but not limited to, a cathode ray tube (CRT), for displaying information to a user. An input device 1312, including alphanumeric and other keys, is coupled to the bus 1303 for communicating information and command selections to the processor(s) 1304. Another type of user input device may include a cursor control 1313, such as, but not limited to, a mouse, a trackball, a fingerpad, or cursor direction keys, for communicating direction information and command selections to the processor(s) 1304 and for controlling cursor movement on the display 1311.

According to one embodiment of the invention, the individual processing units perform specific operations by their respective processor(s) 1304 executing one or more sequences of one or more instructions contained in the main memory 1308. Such instructions may be read into the main memory 1308 from another computer-usable medium, such as the ROM 1309 or the storage device 1310. Execution of the sequences of instructions contained in the main memory 1308 causes the processor(s) 1304 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1304. Such a medium may take many forms, including, but not limited to, non-volatile, volatile and transmission media. Non-volatile media, i.e., media that can retain information in the absence of power, includes the ROM 1309. Volatile media, i.e., media that can not retain information in the absence of power, includes the main memory 1308. Transmission media includes coaxial cables, copper wire and fiber optics, including the wires that comprise the bus 1303.

Common forms of computer-usable media include, for example; a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, or any other physical medium from which a processor 1304 can retrieve information.

Various forms of computer-usable media may be involved in providing one or more sequences of one or more instructions to the processors) 1304 for execution. For example, the instructions may initially be provided on a magnetic disk of a remote computer (not shown). The remote computer may load the instructions info its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 1303 may receive the infrared signals and place the instructions therein on the bus 1303. The bus 1303 may carry the instructions to the main memory 1308, from which the processors) 1304 thereafter retrieves and executes the instructions. The instructions received by the main memory 1308 may optionally be stored on the storage device 1310, either before or after their execution by the processor(s) 1304.

Each processing unit may also include a communication interface 1314 coupled to the bus 1303. The communication interface 1314 provides two-way communication between the respective user stations 1224 and the host computer 1222. The communication interface 1314 of a respective processing unit transmits and receives electrical, electromagnetic or optical signals that include data streams representing various types of information, including instructions, messages and data.

A communication link 1315 links a respective user station 1224 and a host computer 1222. The communication link 1315 may be a LAN 1225, in which case the communication interface 1314 may be a LAN card. Alternatively, the communication link 1315 may be a PSTN 1228, in which case the communication interface 1314 may be an Integrated services digital network (ISDN) card or a modem. Also, as a further alternative, the communication link 1315 may be a wireless network 1230.

A processing unit may transmit and receive messages, data, and instructions, including program, i.e., application, code, through its respective communication link 1315 and communication interface 1314. Received program code may foe executed by the respective processor(s) 1304 as it is received, and/or stored in the storage device 1310, or other associated non-volatile media, for later execution.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of elements in the data structure, and process actions shown in the process flow diagrams described herein is merely illustrative, and the invention can be performed using different or additional data structure elements, process actions, or a different combination or ordering of process actions. The specification and drawings are, accordingly, to be regarded in an illustrative rather than restrictive sense.

What is claimed is:

1. A data structure stored in a memory for storing data for access and execution by a computer system comprising:
    a plurality of nodes, each node comprising:
        an information field containing an information item; and
        a time of life interval field including a beginning point corresponding to a beginning event and an ending point corresponding to an ending event; and
    a plurality of directed edges; each directed edge comprising a direction, each directed edge connecting two of the plurality of nodes, such that one of the plurality of nodes comprises a parent node, and a second of the plurality of nodes comprises a child node, the direction of the directed edge indicating which of the two connected nodes is the parent node and which is the child node;
    wherein each parent node includes a first time of life interval field with a parent beginning point corresponding to a parent beginning event and a parent ending point corresponding to a parent ending event; and
    wherein each child node includes a second time of life interval field comprising a child beginning point corresponding to a child beginning event and a child ending point corresponding to a child ending event.

2. The data structure of claim 1, wherein the child beginning event and the child ending event are bounded by the first time of life interval field.

3. The data structure of claim 1, wherein the parent beginning event occurs at the same time or before the child beginning event and the parent ending event occurs at the same time or after the child ending event.

4. The data structure of claim 3, wherein, for all related parent and child nodes in the data structure, the parent beginning event occurs at the same time or before the child beginning event and the parent ending event occurs at the same time or after the child ending event.

5. The data structure of claim 4, wherein the plurality of nodes further comprises an information type field containing an information type.

6. The data structure of claim 5, wherein the plurality of nodes includes a first child node and a second child node both being children of a common parent node, the first child node containing a first information item having a first information type and a first time of life interval field comprising a beginning point corresponding to a first child beginning event and an ending point corresponding to a first child ending event, the second child node containing a second information stem having the first information type and a second time of life interval field comprising a beginning point corresponding to a second child beginning event that occurs at the same time or later in time than the first child ending event.

7. The data structure of claim 6, wherein the second child node indicates a change in a value for the first information item as of the time the first child beginning event occurred.

8. The data structure of claim 7, wherein the first child ending event corresponds to a point in time at which the value of the first information item changed.

9. The data structure of claim 4, wherein a directed edge of the plurality of directed edges is annotated with an edge type.

10. The data structure of claim 4, wherein the information item comprises a fact about a real-world object.

11. The data structure of claim 4, wherein the data structure comprises a directed acyclic graph.

12. The data structure of claim 4, wherein the ending point in each of the plurality of nodes comprises an indicator that the node is capturing a present state of the information item.

13. The data structure of claim 12, wherein the indicator comprises a blank entry.

14. The data structure of claim 4, wherein each of the plurality of nodes further comprises a version field containing version information.

15. The data structure of claim 14, wherein the version information comprises a version number interval.

16. The memory of claim 4, wherein the memory comprises at least one of a data storage system and a main memory.

17. The data structure of claim 4, wherein the data structure corresponds to a plurality of data packets for each stored node or directed edge including a plurality of associated data fields and size fields indicating sizes of the associated data fields.

18. The data structure of claim 4, wherein the data structure is capable of being queried such that a result set of nodes from the data structure is returned and a slice of the data structure is presented, the slice including the nodes of the result set and the directed edges that connect those nodes.

19. The data structure of claim 18, wherein the data structure is further capable of receiving and integrating a modified version of the slice of the data structure.

20. A computer program product for generating a data structure, the computer program product being encoded on one or more non-transitory machine-readable storage media and comprising:
  instruction for generating a plurality of nodes, each node comprising:
    an information field containing an information item; and
    a time of life interval field including a beginning point corresponding to a beginning event and an ending point corresponding to an ending event; and
  instruction for generating a plurality of directed edges each comprising a direction and connecting two of the plurality of nodes such that one of the plurality of nodes comprises a parent node, and a second of the plurality of nodes comprises a child node, the direction of the directed edge indicating which of the two connected nodes is the parent node and which is the child node;
  wherein each parent node includes a first time of life interval field with a parent beginning point corresponding to a parent beginning event and a parent ending point corresponding to a parent ending event; and
  wherein each child node includes a second time of life interval field comprising a child beginning point corresponding to a child beginning event and a child ending point corresponding to a child ending event.

21. The computer program product of claim 20, wherein the child beginning event and the child ending event are bounded by the first time of life interval field.

22. The computer program product of claim 20, wherein the parent beginning event occurs at the same time or earlier than the child beginning event and the parent ending event occurs at the same time or later than the child ending event.

23. The computer program product of claim 22, wherein for all related parent and child nodes in the data structure, the parent beginning event occurs at the same time or earlier than the child beginning event and the parent ending event occurs at the same time or later than the child ending event.

24. The computer program product of claim 22, wherein the plurality of nodes further comprises an information type field containing an information type.

25. The computer program product of claim 24, wherein the plurality of nodes includes a first child node and a second child node both being children of a common parent node, the first child node containing a first information item having a first information type and a first time of life interval field comprising a beginning point corresponding to a first child beginning event and an ending point corresponding to a first child ending event, the second child node containing a second information item having the first information type and a second time of life interval field comprising a beginning point corresponding to a second child beginning event that occurs at the same time or later in time than the first child ending event.

26. The computer program product of claim 25, wherein the second child node indicates a change in a value for the first information item as of the time the first child beginning event occurred.

27. The computer program product of claim 26, wherein the first child ending event corresponds to a point in time at which the value of the first information item changed.

28. The computer program product of claim 22, wherein a directed edge of the plurality of directed edges is annotated with an edge type.

29. The computer program product of claim 22, wherein the information item comprises a fact about a real-world object.

30. The computer program product of claim 22, wherein the data structure comprises a directed acyclic graph.

31. The computer program product of claim 22, wherein the ending point in each of the plurality of nodes comprises an indicator that the node is capturing a present state of the information item.

32. The computer program product of claim 31, wherein the indicator comprises a blank entry.

33. The computer program product of claim 22, wherein each of the plurality of nodes further comprises a version field, containing version information.

34. The computer program product of claim 33, wherein the version information comprises a version number interval.

35. The computer program product of claim 22, wherein the memory comprises at least one of a data storage system and a main memory.

36. The computer program product of claim 22, wherein the data structure corresponds to a plurality of data packets for each stored node or directed edge including a plurality of associated data fields and size fields indicating sizes of the associated data fields.

37. The computer program product of claim 22, wherein the data structure is capable of being queried such that a result set of nodes from the data structure is returned and a slice of the data structure is presented, the slice including the nodes of the result set and the directed edges that connect those nodes.

38. The computer program product of claim 37, wherein the data structure is further capable of receiving and integrating a modified version of the slice of the data structure.

39. A method of transforming an information item stored in a data structure to an updated information item, as of an update time, comprising:
  locating a first child node in the data structure, the first child node comprising a first information field containing the information item and a first time of life interval field comprising a first beginning point and a first ending point;

creating a second child node, the second child node comprising a second information field containing the updated information item and a second time of life interval field comprising a second beginning point and a second ending point;
setting the first ending point to a value corresponding to a particular event; and
setting the second beginning point to a value corresponding to the particular event.

40. The method of claim 39, wherein the information item indicates a fact about a real-world object.

41. The method of claim 40, wherein the updated information item indicates a changed fact about the real world object.

42. The method of claim 39, wherein the data structure corresponds to a plurality of data packets for each stored node or directed edge including a plurality of associated data fields and size fields indicating sizes of the associated data fields.

43. The method of claim 39, further comprising querying the data structure, returning a result set of nodes from the queried data structure, and presenting a slice of the data structure including the nodes of the result set and the directed edges that connect those nodes.

44. The method of claim 43, further comprising the steps of receiving and integrating a modified version of the slice of the data structure.

45. A method of transforming a legacy database into a data structure, the data structure comprising a plurality of nodes, each node comprising an information field containing an information item; and a time of life interval field specifying a time of life interval for the node, the time of life interval comprising a beginning point and an ending point; and a plurality of directed edges; each directed edge comprising a direction, each directed edge connecting two of the plurality of nodes, such that one of the plurality of nodes comprises a parent node, and a second of the plurality of nodes comprises a child node, the direction of the directed edge indicating which of the two connected nodes is the parent node and which is the child node; wherein each parent node comprises a first time of life interval comprising a parent beginning point corresponding to a parent beginning event and a parent ending point corresponding to a parent ending event and each child node comprises a second time of life interval comprising a child beginning point corresponding to a child beginning event and a child ending point corresponding to a child ending event, and wherein the parent beginning event occurs at the same time or earlier than the child beginning event and the parent ending event occurs at the same time or later than the child ending event the method comprising:
identifying a plurality of items of information stored in the legacy database;
assigning a time of life interval to each of the plurality of items of information;
identifying a parent information item from the plurality of items of information;
migrating the parent information item into the parent node;
identifying a child information item from the plurality of items of information;
migrating the child information item into the child node; and
connecting the parent node to the child node using a directed edge.

46. The method of claim 45, further comprising:
identifying a second plurality of items of information stored in a second legacy database;
assigning a time of life interval to each of the second plurality of items of information;
identifying a second parent information item from the plurality of items of information;
migrating the second parent information item into a second parent node in the data structure;
identifying a second child information item from the second plurality of items of information;
migrating the second child information item info a second child node in the data structure; and
connecting the second parent node to the second child node using a second directed edge.

47. The method of claim 45, wherein said migrating the second parent information item into the second parent node includes creating a new parent node.

48. The method of claim 45, wherein said migrating the second child information item into the second child node includes creating a new child node.

49. The method of claim 45, further comprising:
locating the information item for the updated child information item in the legacy database;
locating a first child node in the data structure comprising a first information field containing the information item and a first time of life interval field comprising a first beginning point and a first ending point;
creating a second child node in the data structure, the second child node comprising a second information field containing the updated child information item and a second time of life interval field comprising a second beginning point and a second ending point;
setting the first ending point to a value corresponding to a particular event; and
setting the second beginning point to a value corresponding to the particular event.

50. The method of claim 45, wherein for all related parent and child nodes in the data structure, the parent beginning event occurs at the same time or earlier than the child beginning event and the parent ending event occurs at the same time or later than the child ending event.

51. The method of claim 45, wherein said migrating the parent information item into the parent node includes creating a new parent node.

52. The method of claim 45, wherein said migrating the child information item into the child node includes creating a new child node.

53. The method of claim 45, wherein the data structure corresponds to a plurality of data packets for each stored node or directed edge including a plurality of associated data fields and size fields indicating sizes of the associated data fields.

54. The method of claim 45, further comprising querying the data structure, returning a result set of nodes from the queried data structure, and presenting a slice of the data structure including the nodes of the result set and the directed edges that connect those nodes.

55. The method of claim 54, further comprising the steps of receiving and integrating a modified version of the slice of the data structure.

* * * * *